May 21, 1957
G. MULLER
2,793,217
NEW DERIVATIVES OF ADRENOSTERONE AND A
PROCESS OF MAKING SAME
Filed June 23, 1954
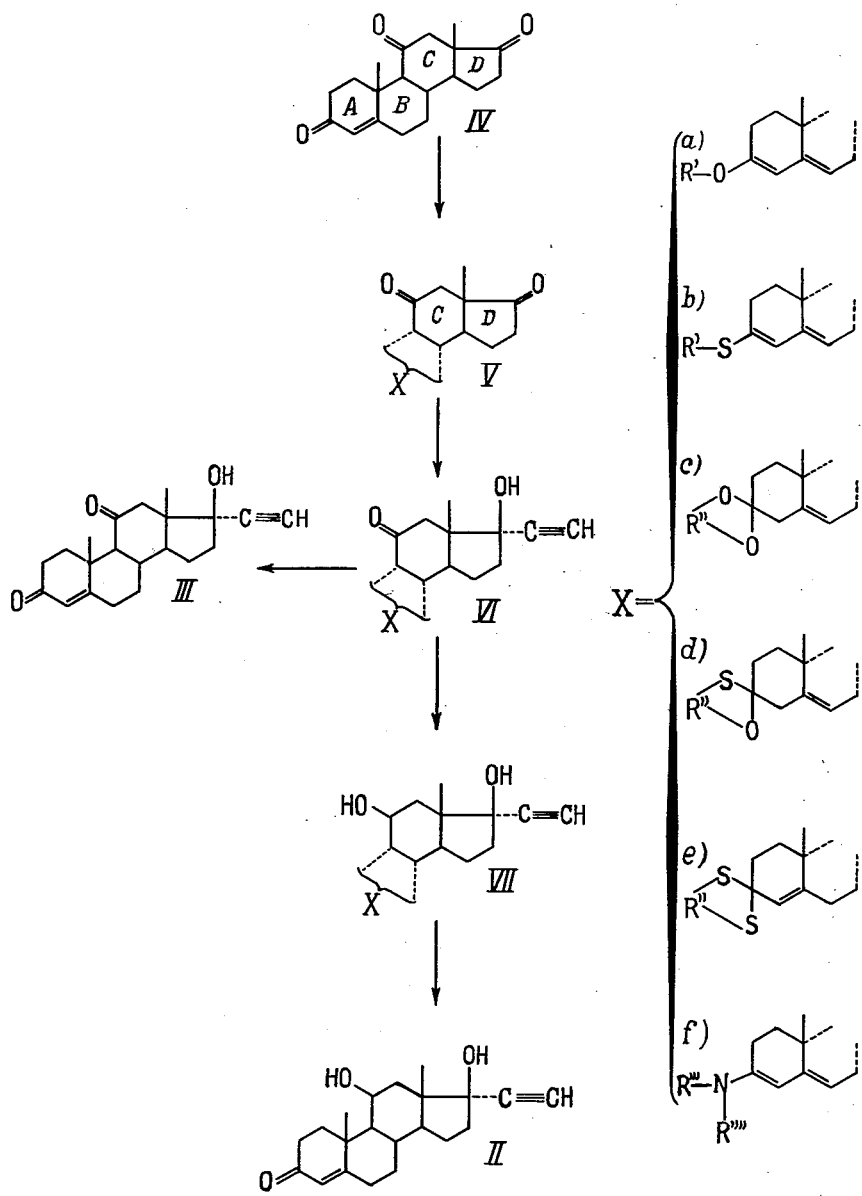
INVENTOR.
GEORGES MULLER
BY
ATTORNEYS _United States Patent Office_ 2,793,217
Patented May 21, 1957

2,793,217
NEW DERIVATIVES OF ADRENOSTERONE AND A PROCESS OF MAKING SAME

Georges Muller, Paris, France, assignor to Les Laboratoires Francais de Chimiotherapie, Paris, France, a French body corporate Application June 23, 1954, Serial No. 438,746

Claims priority, application France June 27, 1953

2 Claims. (Cl. 260—397.45)

This invention relates to new derivatives of adrenosterone and more particularly to 17-ethynyl testosterone compounds having in 11-position an oxygen containing group, and to a process of making same.

One object of this invention is to provide new and valuable 17-ethynyl testosterone compounds which have in 11-position an oxygen containing group; said new compounds are very important intermediates of the polyhydro cyclopentano phenanthrene series.

Another object of this invention is to provide a simple and effective process of making such new 17-ethynyl testosterone compounds.

Other objects of this invention and advantageous features thereof will become apparent as the description proceeds.

The new and valuable 17-ethynyl testosterone compounds according to the present invention which possess in ring C in 11-position an oxygen containing group, such as a secondary alcohol group or a keto group, correspond to the following Formula I

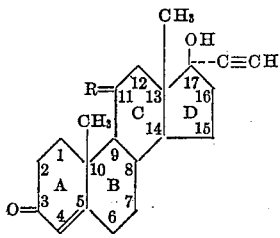

wherein R indicates a secondary alcohol group

or a keto group (R:=O). Formula I, thus, comprises the two compounds 11β-hydroxy-17-ethynyl testosterone and 11-keto-17-ethynyl testosterone. Formulas II and III of the attached drawings illustrate the constitution of said two compounds.

Said drawings show diagrammatically in what manner the one or the other of said new compounds are produced by using as a starting material adrenosterone of Formula IV which is known for a long time and which, heretofore, had no particular value.

Adrenosterone of Formula IV has a keto group in 11-position, said keto group being of very low reactivity while the other oxygen containing groups in 3- and 17-position are of normal reactivity. Consequently, reaction of adrenosterone with acetylene will cause attachment of the ethynyl residue to the 3- as well as to the 17-position of the molecule.

To carry out the process according to the present invention and to introduce an ethynyl residue in 17-position only, it is necessary to protect the keto group in 3-position against the action of the reactant. This is achieved by converting said keto group into a group which is stable in alkaline medium and which permits easy regeneration of the free keto group in an acid medium. The resulting adrenosterone derivative having a protected keto group in 3-position and free keto groups in 11- and 17-positions of which, however, only the 17-keto group is reactive, is then reacted with acetylene to introduce the acetylene residue in 17-position. Thus, the ethynyl compound of Formula VI is obtained which, on reduction, yields the corresponding 11β-hydroxy derivative of Formula VII. Said derivative, on hydrolysis in acid medium, is converted into 11β-hydroxy-17-ethynyl testosterone of Formula II. The keto compound of Formula VI, on hydrolysis in acid medium, yields the corresponding 11-keto-17-ethynyl testosterone of Formula III.

The process according to the present invention, thus, is primarily characterized by the feature that adrenosterone is condensed with an agent capable of protecting the carbonyl group in 3-position, thereby yielding a 3-keto derivative which is stable in alkaline medium and readily hydrolysable in acid medium. Said 3-keto derivative is then converted into the corresponding 17-ethynyl derivative. Said 17-ethynyl derivative is subjected to reduction of the 11-keto group to form the 11β-hydroxy-17-ethynyl compound with a protected keto group in 3-position, whereafter hydrolysis in acid medium is effected setting free the 3-keto group and yielding 11β-hydroxy-17-ethynyl testosterone. When omitting the reduction step, hydrolysis of the 11-keto-17-ethynyl compound with a protected keto group in 3-position yields directly 11-keto-17-ethynyl testosterone.

The preferred adrenosterone derivatives to be used in the process of this invention which have a protected 3-keto group are the following:

1. The 3-adrenosterone enolic ethers or thioethers of Formula V wherein X represents group $a$ or group $b$ of the attached drawings and $R_1$ is an alkyl or aralkyl radical and especially a lower alkyl and benzyl radical.

2. The 3-cyclic acetals of adrenosterone of Formula V wherein X represents group $c$ and $R_2$ is an alkylene radical, such as the ethylene radical $-CH_2-CH_2-$.

3. The 3-hemimercaptals of Formula V wherein X represents group $d$ and $R_2$ is an alkylene radical, such as the ethylene radical.

4. The 3-cyclic mercaptals of Formula V wherein X represents group $e$ and $R_2$ is an alkylene radical, such as the ethylene radical.

5. The 3-enamines of Formula V wherein X represents group $f$ and $R_3$ and $R_4$ are alkyl or aralkyl radicals and preferably lower alkyl or benzyl radicals, or they may form a divalent radical, such as an alkylene radical, for instance, the radical $-(CH_2)_4-$.

All the above mentioned derivatives are stable in alkaline medium and permit the attachment of acetylene in 17-position as well as reduction by means of double hydrides as will be shown in the following examples.

Following a more detailed description of each separate step of the process according to the present invention is given.

STEP 1

Preparation of the compounds of Formula V.

The 3-enol ethers of adrenosterone are obtained by reacting the corresponding ortho-formates with adrenosterone under substantially anhydrous conditions. Other 3-derivatives of adrenosterone are obtained by reaction with thiols, glycols, thioglycols, or amines.

STEP 2

Attachment of the acetylene residue in 17-position and production of compounds of Formula VI.

Acetylene is attached to the keto group in 17-position of compounds of Formula V by using methods as they are conventionally used in steroid chemistry for said purpose, for instance, by working in the presence of alkali metal or alkaline earth metal alcoholates or amides, such as sodium, potassium, lithium, or calcium alcoholates or amides, in an indifferent solvent. It is also possible to carry out said reaction in the presence of liquid ammonia which dissolves the alkali metals, thereby yielding their amides in situ.

STEP 3

Reduction of compounds of Formula VI to 11β-hydroxy derivatives of compounds of Formula VII.

Said reduction is effected by using as reducing agent a double hydride. Especially suitable hydrides are, for instance, lithium aluminum hydride, or potassium, sodium, or lithium boron hydride. Said hydrides are capable of reducing the carbonyl group in 11-position to a secondary alcohol group which is oriented in β-arrangement, without reducing the acetylene residue to the corresponding ethylene residue. This is an entirely unexpected course of reaction which could not be predicted. On the contrary, prior work shows that double hydrides and especially lithium aluminum hydride represent excellent agents for reducing acetylene compounds to ethylene compounds.

The process according to the present invention, thus, is based more specifically upon said unforeseen feature that, with the starting and intermediate materials of the present invention, reduction of the 11-carbonyl group takes place exclusively while the acetylene triple bond is not even partly affected by said reducing agent. Reduction with said hydrides is carried out in the usual manner and under usual reaction conditions, preferably in an indifferent solvent when working with lithium aluminum hydride, or in alcoholic, aqueous-alcoholic, or aqueous medium when working with boron hydrides. Any nonreacted hydride is destroyed after reduction is complete, and the 11β-hydroxy compound is extracted from the reaction mixture by means of a solvent and is purified by crystallization after the solvent has been distilled off.

STEP 4

Acid hydrolysis of compounds VII to compound II and of compounds VI to compound III.

This operation is very simply carried out by boiling the compound to be hydrolyzed for several minutes with an acidified alcohol. According as to whether the derivative of Formula VI is directly hydrolyzed or after reduction to compound VII, there are obtained 11-keto-17-ethynyl testosterone or 11β-hydroxy-17-ethynyl testosterone, respectively.

It is understood, of course, that the order of some of the above described operations can be varied without departing from the spirit of this invention. Thus, it is possible to first reduce the keto group in 11-position by means of metal hydrides after protecting the keto groups in 3- and in 17-position of adrenosterone, thereafter selectively hydrolyzing the protecting group in 17-position or completely hydrolyzing the protective groups in 3- and 17-position and reforming the protective group in 3-position only, and then attaching acetylene to the resulting 11β-hydroxy derivative. By hydrolyzing the resulting ethynyl compound corresponding to Formula VII, 11β-hydroxy-17-ethynyl testosterone of Formula II is obtained.

It is also possible to convert 11-keto-17-ethynyl testosterone into 11β-hydroxy-17-ethynyl testosterone by protecting the 3-keto group against the action of the reducing agent in the manner as described for adrenosterone and then reducing the resulting derivatives of Formula VI to yield compounds VII which are then hydrolyzed to 11β-hydroxy-17-ethynyl testosterone.

11-keto-17-ethynyl testosterone might be obtained by oxidizing 11β-hydroxy-17-ethynyl testosterone of Formula II.

The following examples serve to illustrate this invention without, however, limiting the same thereto. All the melting points given are points of instantaneous melting taken on the Maquenne block.

*Example 1*

PREPARATION OF THE 3-METHYL ENOL ETHER OF ADRENOSTERONE (FORMULA Va WHEREIN $R_1$ IS $C_2H_5$)

5 cc. of absolute ethanol, 1 cc. of redistilled ethyl ortho-formate, and 0.2 cc. of a solution of 0.1 cc. of pure sulfuric acid in 50 cc. of absolute ethanol, are added to 1 g. of pure adrenosterone melting at 222° C. and having an optical rotatory power $[\alpha]_D^{20}: +267°$ ($c:1\%$ in acetone). The mixture is heated to boiling and allowed to boil for exactly 3 minutes. Thereafter 0.2 cc. of triethylamine are added to the greenish-yellow solution and subsequently, while stirring, 3 cc. of water. The mixture is cooled with ice and is allowed to crystallize. The crystals are filtered off and washed with 50% alcohol (containing 0.5% of pyridine). After drying, 900 mg. of a crude product melting on the block at about 150° C. are obtained. The yield amounts to about 80% to 85%. Said crude product is recrystallized from absolute ethanol (containing 0.5% of pyridine) and yields a product which is sufficiently pure for condensation with acetylene. The total yield of said pure product is about 70%.

For analytical purposes, said product is several times recrystallized from acetone and aqueous alcohol. The pure 3-ethyl enol ether of adrenosterone forms colorless, rhomboidal crystals which melt at 147° C. and again at 158° C.; $[\alpha]_D: +6° \pm 1.5°$ ($c: 0.5\%$ in ethanol containing 10% of pyridine).

*Analysis.*—Calculated for $C_{21}H_{28}O_3$: 76.79% C.; 8.59% H. Found: 76.8% C.; 8.6% H.

*Example 2*

PREPARATION OF 11 - KETO - 17 - ETHYNYL - TESTOSTERONE (FORMULA III)

2 g. of the enol ether obtained according to Example 1 are dissolved in a mixture of 20 cc. of water-free benzene and 10 cc. of dry ether.

About 80 cc. of a solution, obtained on dissolving 4.75 g. of potassium metal in a solvent mixture of 60 cc. of tertiary amyl alcohol and 16 cc. of benzene and saturating said solution with acetylene, are added to the solution of the enol ether, thereby passing nitrogen through the container. The mixture of the two solutions becomes reddish-orange. Acetylene is caused to pass through said mixture for two hours whereby no change in color takes place. Introduction of acetylene is discontinued and 50% acetic acid is added until the mixture is neutralized while passing nitrogen through the reaction container. During neutralization, care must be taken to keep the temperature not higher than 20° C.

The solution is decanted and is washed successively with water, N sodium hydroxide solution, water, N sulfuric acid, water, 2% sodium carbonate solution, and water. The washed solution is dried over magnesium sulfate and is distilled to dryness in a vacuum at a temperature not exceeding 45° C. Residual benzene is removed by means of ethanol. The resulting crude ethynyl enol ether is obtained in the form of a pale yellow gum which is readily soluble.

To hydrolyze said enol ether, the gum is dissolved in 20 cc. of ethanol. 5 drops of 2 N hydrochloric acid are added to said solution. The mixture is heated to 60° C. for 5 minutes whereby copious crystallization takes place. The reaction mixture is cooled with ice, the crystals are filtered off and dried. 1.6 g. of 11-keto-17-ethynyl testosterone melting at about 280° C. are obtained. The yield is about 80%. Said product is recrystallized from 200 cc. of ethanol. The resulting pure product, 1.180 g., melts at 297° C. on the block, $[\alpha]_D: +101°$ (c: 0.5% in dioxane).

For analytical purposes said product is furthermore purified by sublimation to remove therefrom any traces of solvent.

Analysis.—Calculated for $C_{21}H_{26}O_3$: 77.26% C; 8.03% H. Found: 77.3% C; 8.2% H.

Example 3

PREPARATION OF THE 3-ETHYL ENOL ETHER OF 11-HYDROXY-17-ETHYNYL TESTOSTERONE (FORMULA VIIa WHEREIN $R_1$ IS $C_2H_5$) AND HYDROLYSIS TO 11β-HYDROXY-17-ETHYNYL TESTOSTERONE (FORMULA II)

3.15 g. of the crude 3-ethyl enol ether of 17-ethynyl adrenosterone obtained according to Example 2 are dissolved in 300 cc. of peroxide-free ether. 6.5 g. of lithium aluminum hydride are added in small portions within about 5 to 10 minutes to said solution while stirring. The reaction mixture is kept at boiling temperature for about one hour, and is then cooled. 100 cc. of ether saturated with water are added thereto until gas development ceases. 500 cc. of water and 100 cc. of technical acetic acid are added. The liquid is decanted, washed with N sodium hydroxide solution and with water, and is dried over magnesium sulfate. The solvent is then removed by distillation and the remaining gummy residue is dissolved in 15 cc. of ethanol. 10 drops of 2 N hydrochloric acid are added to said solution and the mixture is heated under reflux for 2 to 3 minutes. Copious crystallization takes place. Addition of 100 cc. of water completes precipitation of crystals. The crystals are filtered off and dried in a drying oven. 2.56 g. of 11β-hydroxy-17-ethynyl testosterone are obtained. Yield: about 80%. Melting point: 278° C.

Said compound is recrystallized by dissolving it in 100 parts by volume of methanol. The filtered solution is concentrated by evaporation to ⅕ of its original volume and is cooled with ice. Its melting point is then 280° C.; $[\alpha]_D: +55°$ (c: 0.5% in dioxane).

For analytical purposes, the product is freed from the last traces of solvent by sublimation. The analytical data of such a sublimated product are as follows:

Calculated for $C_{21}H_{28}O_3$: 76.79% C; 8.59% H; 14.62% O. Found: 76.7% C; 8.7% H; 15.2% O.

The product contains an acetylene residue since it gives a precipitate with ammoniacal silver nitrate solution. On the other hand, it gives color reactions which are characteristic for the 11β-hydroxyl group, such as a green fluorescence by the action of sulfuric acid according to the method described by Shoppee and Reichstein in Helv. Chim. Acta., vol. 26, page 1316 (1943), and by Mason in J. Biol. Chem., vol. 182, page 131 (1950).

Example 4

DIRECT PREPARATION OF THE ETHYL ENOL ETHER OF 11-KETO-17-ETHYNYL TESTOSTERONE (FORMULA VIa WHEREIN $R_1$ IS $C_2H_5$) AND PRODUCTION OF 11β-HYDROXY-17-ETHYNYL TESTOSTERONE (FORMULA II) THEREFROM 320 mg. of 11-keto-17-ethynyl testosterone are heated to boiling in 1.6 cc. of absolute ethanol in the presence of 0.32 cc. of ethyl ortho-formate and 3 drops of a mixture of 0.1 cc. of pure concentrated sulfuric acid and 50 cc. of ethanol. After heating the mixture under reflux for 7 minutes, complete solution takes place. The reaction is completed by boiling for 3 minutes.

4 drops of triethylamine and 10 cc. of water are added to the reaction mixture which is then extracted three times with 40 cc. of ether. The ethereal extract is washed with water, dried over magnesium sulfate and subsequently over potassium hydroxide, filtered, and concentrated by evaporation to a volume of about 30 cc.

Reduction and hydrolysis of said enol ether is carried out under the same conditions as described in Example 3. 280 mg. of 11β-hydroxy-17-ethynyl testosterone melting at 278° C. (on the block) are obtained. Yield: About 88%.

Example 5

PREPARATION OF 11-KETO-17-ETHYNYL TESTOSTERONE (FORMULA III)

2 g. of the enol ether obtained according to Example 1 are dissolved in a mixture of 20 cc. of water-free benzene and 10 cc. of dry ether. About 80 cc. of a solution, obtained on dissolving 4.75 g. of potassium metal in a mixture of 60 cc. of tertiary butyl alcohol and 16 cc. of benzene and saturating said solution with acetylene, are added to the solution of the enol ether. A current of nitrogen is bubbled through said mixture for several minutes whereafter acetylene is passed through the mixture for 2 hours. The resulting solution is worked up in the same manner as described in Example 2. Thereby 1.3 g. of 11-keto-17-ethynyl testosterone, corresponding to a yield of about 65% are obtained. Said reaction product, after recrystallization from ethanol, is identical with 11-keto-17-ethynyl testosterone obtained when proceeding according to Example 2.

Example 6

PREPARATION OF 11-KETO-17-ETHYNYL TESTOSTERONE (FORMULA III)

2 g. of the enol ether obtained according to Example 1 are dissolved in a mixture of 20 cc. of water-free benzene and 10 cc. of dry ether. To said mixture there are added about 400 cc. of a solution prepared by dissolving 3 g. of sodium metal in a mixture of 300 cc. of tertiary amyl alcohol and 100 cc. of benzene and saturating said solution with acetylene. On proceeding in about the same manner as described in Example 2, 0.9 g. of 11-keto-17-ethynyl testosterone, corresponding to a yield of about 45%, are obtained. Said reaction product, after recrystallization from 100 cc. of ethanol, melts at 297° C. on the block, $[\alpha]_D^{20}: +101°$ (c: 0.5% in dioxane).

Example 7

PREPARATION OF 11β-HYDROXY-17-ETHYNYL TESTOSTERONE (FORMULA II)

3 g. of the crude 3-ethyl enol ether of 11-keto-17-ethynyl testosterone, obtained according to Example 2, 5, or 6, are dissolved in a mixture of 100 cc. of tetrahydrofurane and 40 cc. of dimethyl formamide. Said solution is poured into a solution of 5 g. of potassium boron hydride in 100 cc. of water whereby care must be taken that the temperature of the mixture does not exceed 35° C. The mixture is stirred at said temperature for 2 to 3 hours and is then allowed to cool. 200 cc. of water are added thereto and the mixture is neutralized by means of 50% acetic acid. The resulting reaction mixture is then extracted by means of 500 cc. of ether, the ethereal solution is washed with N sodium hydroxide solution and with water, dried over anhydrous magnesium sulfate, and evaporated to dryness. The remaining gummy residue is treated and further worked up as described in Example 3 and yields 2.1 g. of 11β-hydroxy-17-ethynyl testosterone, corresponding to a yield of about 65%. Melting point: 280° C., $[\alpha]_D^{20} +55°$ (c: 0.5% in dioxane).

Example 8

PREPARATION OF 11β-HYDROXY-17-ETHYNYL TESTOSTERONE (FORMULA II)

3 g. of adrenosterone are converted as described by Bernstein et al. in J. Am. Chem. Soc., vol. 75, page 1481 (1953); and in J. Org. Chem., vol. 18, page 1166 (1953) into Δ5-androstene-3,11,17-trione-3,17-diethylene ketal. The free 11-keto group is then reduced by means of lithium aluminum hydride to the corresponding hydroxyl group and the reduction product is hydrolyzed by means of aqueous acetic acid to Δ4-androstene-11β-ol-3,17-dione. 1.4 g. of said compound, corresponding to about 46% of the theoretical yield, are obtained thereby.

Said compound is treated as described in Example 1 with ethyl ortho-formate yielding the 3-ethyl enol ether of Δ5-androstene-11β-ol-17-one which is converted into the corresponding 17-ethynyl compound in an analogous manner as described in Example 2. On acid hydrolysis of the resulting reaction product, 0.95 g. of 11β-hydroxy-17-ethynyl testosterone corresponding to about 61% of the theoretical yield, are obtained. Said compound possesses the same characteristic properties as the compound obtained according to Example 3. The melting point of a mixture of both compounds is not depressed.

It is understood, of course, that the present invention is not limited to the reaction conditions and reactants given in the examples, but that many changes and variations in the starting materials, the reactants used, the reaction temperatures and durations, the methods of isolating the reaction products from the reaction mixtures and of purifying the same, and the like, may be made by those skilled in the art in accordance with the principles set forth herein and in the claims annexed hereto.

As stated above, the new compounds are important intermediates in the manufacture, for instance, of cortisone. Considerable amounts of adrenosterone are obtained by oxidizing degradation of certain steroid compounds which are recovered as undesired by-products in the synthesis of steroid hormones. Said adrenosterone which heretofore has been considered as practically worthless can readily be converted into cortisone by first producing the 11β-hydroxy- or 11-keto-17-ethynyl testosterone compounds according to the present invention and subsequently converting said 17-ethynyl testosterone compounds in a manner and by methods known per se into cortisone. For this purpose, for instance, the triple bond in said 11β-hydroxy- or 11-keto-17-ethynyl testosterone is reduced to the double bond. The resulting pregnadiene compound is then treated with osmium tetroxide yielding the corresponding triol compound which is acylated in 21-position and is oxidized by means of chromium trioxide to 11β-hydroxy- or 11-keto-3,20-diketo-17β-hydroxy-21-acyloxy-Δ4-pregnene. Splitting off water from said compound yields 11β-hydroxy- or 11-keto-3,20-diketo-21-acyloxy-Δ4,16-pregnadiene which is readily converted into cortisone. The following reaction diagram illustrates the reactions involved in producing cortisone and the like compounds from adrenosterone by first producing the intermediate compounds according to the present invention:

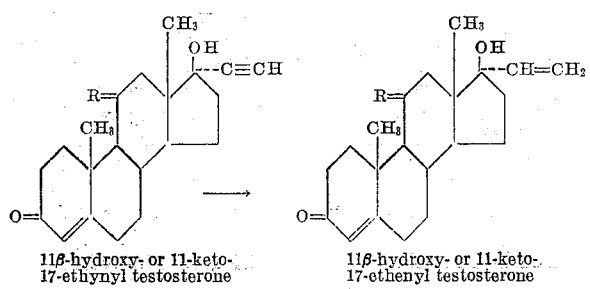

11β-hydroxy- or 11-keto-17-ethynyl testosterone → 11β-hydroxy- or 11-keto-17-ethenyl testosterone

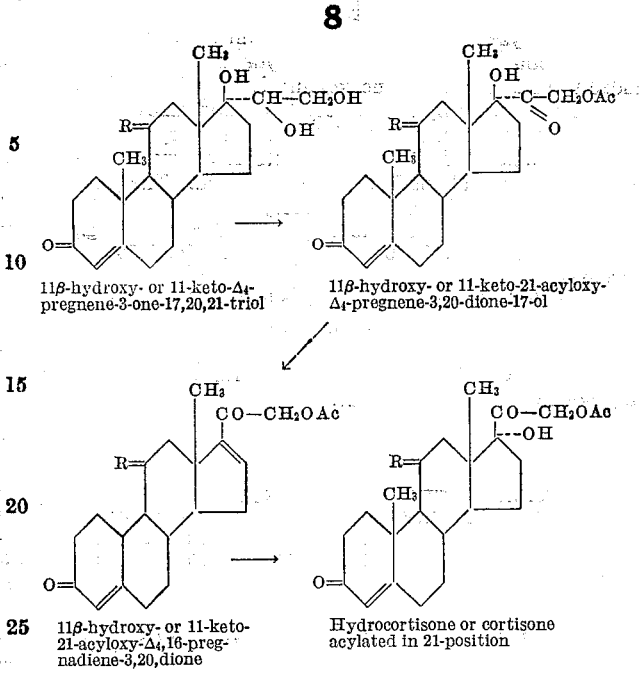

11β-hydroxy- or 11-keto-Δ4-pregnene-3-one-17,20,21-triol → 11β-hydroxy- or 11-keto-21-acyloxy-Δ4-pregnene-3,20-dione-17-ol 11β-hydroxy- or 11-keto-21-acyloxy-Δ4,16-pregnadiene-3,20-dione → Hydrocortisone or cortisone acylated in 21-position In said formulas, R indicates a keto or a hydroxyl group and Ac an acyl group.

I claim:

1. In a process of preparing a 17-ethynyl testosterone compound having in 11-position an oxygen containing group, the steps comprising boiling an alcoholic solution of adrenosterone with ethyl ortho-formate in the presence of sulfuric acid as catalyst, adding triethylamine to said reaction mixture to render the same alkaline, cooling the reaction mixture, filtering off the resulting 3-ethyl enol ether of adrenosterone, dissolving said ether in a mixture of benzene and ether, adding to said solution an alkali metal alcoholate, passing acetylene through said mixture, thereby keeping the reaction mixture in a nitrogen atmosphere, neutralizing said reaction mixture, separating the resulting 3-ethyl enol ether of 17-ethynyl adrenosterone, heating the ethanolic solution of said ether to 60° C. in the presence of aqueous mineral acid to hydrolyze said ether, and isolating the resulting 11-keto-17-ethynyl testosterone.

2. In a process of preparing a 17-ethynyl testosterone compound having in 11-position an oxygen containing group, the steps comprising boiling an alcoholic solution of adrenosterone with ethyl ortho-formate in the presence of sulfuric acid as catalyst, adding triethylamine to said reaction mixture to render the same alkaline, cooling the reaction mixture, filtering off the resulting 3-ethyl enol ether of adrenosterone, dissolving said ether in a mixture of benzene and ether, adding to said solution an alkali metal alcoholate, passing acetylene through said mixture, thereby keeping the reaction mixture in a nitrogen atmosphere, neutralizing said reaction mixture, separating the resulting 3-ethyl enol ether of 17-ethynyl adrenosterone, dissolving said ether in ether, adding to said solution lithium aluminum hydride, boiling the reaction mixture, thereby adding water-saturated ether until gas development ceases, isolating from said mixture the 3-ethyl enol ether of 11-hydroxy-17-ethynyl testosterone, dissolving said enol ether in ethanol, boiling said solution with aqueous hydrochloric acid to cause hydrolyzation thereof, and isolating the resulting 11β-hydroxy-17-ethynyl testosterone from the hydrolysis mixture.

References Cited in the file of this patent

UNITED STATES PATENTS

| | | |
|---|---|---|
| 2,731,479 | Marshall | Jan. 17, 1956 |
| 2,740,798 | Ralls | Apr. 3, 1956 |